United States Patent
Lassila

(10) Patent No.: US 11,575,287 B2
(45) Date of Patent: Feb. 7, 2023

(54) ARRANGEMENT FOR REDUCING EDDY CURRENT LOSSES OF AN OUTER ROTOR ELECTRIC MACHINE

(71) Applicant: BAE Systems Hägglunds Aktiebolag, Örnsköldsvik (SE)

(72) Inventor: Viktor Lassila, Arnäsvall (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 85 days.

(21) Appl. No.: 16/975,028

(22) PCT Filed: Mar. 19, 2019

(86) PCT No.: PCT/SE2019/050249
§ 371 (c)(1),
(2) Date: Aug. 21, 2020

(87) PCT Pub. No.: WO2019/182503
PCT Pub. Date: Sep. 26, 2019

(65) Prior Publication Data
US 2021/0006113 A1    Jan. 7, 2021

(30) Foreign Application Priority Data
Mar. 23, 2018  (SE) .................................. 1850329-2

(51) Int. Cl.
*H02K 1/27*       (2022.01)
*H02K 1/2786*    (2022.01)
(Continued)

(52) U.S. Cl.
CPC ............. *H02K 1/2786* (2013.01); *H02K 1/30* (2013.01); *H02K 21/222* (2013.01)

(58) Field of Classification Search
CPC ........ G11B 11/10515; G11B 11/10532; G11B 11/10552; G11B 11/10573;
(Continued)

(56) References Cited

U.S. PATENT DOCUMENTS 4,205,247 A *  5/1980  Brammerlo ........ H02K 11/0141
                                                        310/58
7,696,658 B2    4/2010  Hashiba
(Continued)

FOREIGN PATENT DOCUMENTS

| CH | 213321 A | 1/1941 |
| JP | H0386051 A | 4/1991 |
| WO | WO-2015045544 A1 | 4/2015 |

OTHER PUBLICATIONS

International Search Report and written Opinion received for PCT Patent Application No. PCT/SE2019/050249, dated May 13, 2019, 10 pages.
(Continued)

*Primary Examiner* — Naishadh N Desai
(74) *Attorney, Agent, or Firm* — Morrison and Foerster LLP

(57) ABSTRACT

The present invention relates to an arrangement (O1, S1) of an outer rotor electric machine for reducing eddy current losses of the outer rotor electric machine (I). The outer rotor electric machine comprises a rotatably arranged rotor (10) and a stator (20). Said rotor comprises an outer rotor portion (12) surrounding said stator (20) or part of said stator and a wheel like end wall portion (14). One end (22a) of said stator (20) is arranged to face said end wall portion (14). The arrangement comprises a plurality of openings (O1) distributed on said end wall portion (14) so as to reduce appearance of eddy currents associated with said end wall portion (14) during operation of said electric machine (I). The present invention also relates to an outer rotor electric machine. The present invention also pertains to a platform.

11 Claims, 2 Drawing Sheets

(51) Int. Cl.
*H02K 1/30* (2006.01)
*H02K 21/22* (2006.01)

(58) Field of Classification Search
CPC .. G11B 11/10576; H02K 1/2786; H02K 1/30;
H02K 21/22; H02K 21/222; H02K 7/006;
H02K 7/14; H02K 7/1815; H02K 9/06
See application file for complete search history.

(56) References Cited

U.S. PATENT DOCUMENTS

| | | | |
|---|---|---|---|
| 9,391,489 B2 | 7/2016 | Atkins et al. | |
| 2002/0145348 A1 | 10/2002 | Anma | |
| 2007/0200445 A1* | 8/2007 | Yamagiwa | H02K 7/14 310/156.32 |
| 2007/0252465 A1* | 11/2007 | Sasaki | H02K 1/2786 310/67 R |
| 2015/0349593 A1* | 12/2015 | Jiang | H02K 21/22 310/43 |

OTHER PUBLICATIONS

Extended European Search Report received for European Patent Application No. 19771587.3 dated Nov. 16, 2021, 9 pages.

* cited by examiner

ARRANGEMENT FOR REDUCING EDDY CURRENT LOSSES OF AN OUTER ROTOR ELECTRIC MACHINE

CROSS REFERENCE TO RELATED APPLICATIONS

This application is a national stage application under 35 U.S.C. § 371 of International Application No. PCT/SE2019/050249, filed internationally on Mar. 19, 2019 which claims priority to SE 1850329-2, filed Mar. 23, 2018, the disclosures of which are herein incorporated by reference in their entirety.

TECHNICAL FIELD

The present invention relates to an arrangement of an outer rotor electric machine for reducing eddy current losses of the outer rotor electric machine. The present invention also relates to an outer rotor electric machine. The present invention also relates to a platform, e.g. e motor vehicle, having an outer rotor electric machine.

BACKGROUND

An electric machine comprises a rotor and a stator. A type of electric machine is an outer rotor electric machine where at least a portion of the stator is surrounded by the rotor.

The windings and magnets of an electric machine create eddy currents in adjacent magnetically conductive materials. The eddy currents cause heat to build up in the electric machine, lowers efficiency and increase the cooling requirements. This is referred to as eddy current losses. A problem with an outer rotor electric machine is that a non-moving electric winding causes eddy current problems in an adjacent rotating surface. The electric load together with the electric frequency provided is what changes the magnetic field.

US2007252465A1 discloses an outer rotor electric machine and addresses the problem of eddy current losses of such an outer rotor electric machine.

It is desired to efficiently reduce eddy current losses of such electric machines.

OBJECTS OF THE INVENTION

An object of the present invention is to provide an arrangement of an outer rotor electric machine for reducing eddy current losses of the outer rotor electric machine which is efficient and facilitates providing a compact electric machine.

Another object of the present invention is to provide an outer rotor electric machine comprising such an arrangement.

Another object of the present invention is to provide a platform comprising such an outer rotor electric machine.

SUMMARY OF THE INVENTION

These and other objects, apparent from the following description, are achieved by an arrangement, an electric machine and a platform, as set out in the appended independent claims. Preferred embodiments of the arrangement and platform are defined in appended dependent claims.

According to the invention the objects are achieved by an arrangement of an outer rotor electric machine for reducing eddy current losses of the outer rotor electric machine. Said electric machine comprises a rotatably arranged rotor and a stator. Said rotor comprises an outer rotor portion surrounding said stator or part of said stator and a wheel like end wall portion. One end of said stator is arranged to face said end wall portion. Said arrangement comprises a plurality of openings distributed on said end wall portion so as to reduce appearance of eddy currents associated with said end wall portion during operation of said electric machine.

By thus distributing a plurality of opening on the end wall portion so that eddy currents are reduced a very compact electric machine with high efficiency may be obtained in that the stator may be arranged close to the wheel like rotor wall portion. Thus, hereby a compact outer rotor machine may be provided without being negatively affected by eddy current losses.

According to an embodiment of the arrangement said openings are distributed circumferentially of said end wall portion. By thus distributing said openings circumferentially of the end wall portion efficient reduction of appearance of eddy currents is facilitated in that such distributed openings efficiently breaks circuits for eddy currents.

According to an embodiment of the arrangement said openings are obtained by a number of radially running spokes distributed around said end wall portion. Radially running spokes provides a robust wheel like rotor wall portion with openings there between for efficient reduction of eddy currents.

According to an embodiment of the arrangement said openings are slots running radially on said flywheel portion. Radially running slots provides efficient reduction of eddy currents and may be particularly efficient for reducing eddy currents when the electric machine is operated at high frequencies.

According to an embodiment of the arrangement said openings have a circular sector configuration. Openings having a circular sector configuration provide a robust wheel like rotor wall portion with openings there between for efficient reduction of eddy currents.

According to an embodiment of the arrangement said circular sector configuration of said plurality of openings have rounded corners. By thus providing rounded corners of said circular sector configuration of said plurality of openings the risk of cracks occurring are in connection to the openings is reduced, wherein a robust wheel like rotor wall portion is obtained.

According to an embodiment of the arrangement said radially running spokes distributed around said end wall portion comprise a sloped radially running surface creating a portion with an increased distance to said rotor. By thus providing a sloped radially running surface creating a portion with an increased distance to said rotor an even more compact electric machine is facilitated in that the stator may be arranged close to the rotor end wall portion and still obtaining the reduction of appearance of eddy currents at the end wall portion of the rotor.

According to an embodiment of the arrangement said end wall portion constitutes a flywheel portion. Hereby a very compact arrangement may be obtained when using e.g. an internal combustion engine for rotation of said rotor in that the flywheel portion of the rotor may be utilized as the flywheel of the internal combustion engine so that the crankshaft of the internal combustion engine may be directly connected to the flywheel portion of the rotor, thus not requiring any coupling or internal combustion engine flywheel in that the flywheel portion of the rotor will provide the flywheel function.

According to an embodiment of the arrangement said electric machine is a flywheel electric machine.

According to an embodiment of the arrangement said electric machine comprises a housing configuration comprising a stator support portion for supporting said stator. The stator support portion is according to an embodiment centrally arranged of the housing. The stator support portion may alternatively be arranged non-centrally of the housing, i.e. with a certain displacement, e.g. for facilitating an oil sump of the housing. The housing may according to an embodiment have a ring shaped cross section where the support portion of the housing may be centrally arranged or non-centrally arranged. The stator support portion is centrally arranged relative to the stator.

According to an embodiment of the arrangement said electric machine is associated with a combustion engine for driving said rotor, said flywheel portion of said rotor constituting a flywheel for said combustion engine.

According to the invention the objects are achieved by an outer rotor electric machine comprising an arrangement as set out herein.

According to the invention the objects are achieved by a platform comprising an outer rotor electric machine as set out herein.

According to an embodiment the platform comprises a vehicle.

DESCRIPTION OF THE DRAWINGS

For a better understanding of the present invention reference is made to the following detailed description when read in conjunction with the accompanying drawings, wherein like reference characters refer to like parts throughout the several views, and in which.

DETAILED DESCRIPTION

Figure 1:
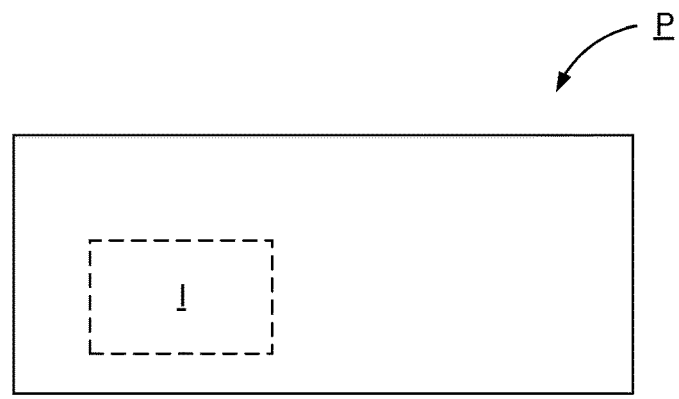
FIG. 1 schematically illustrates a platform according to an embodiment of the present invention.

With reference to FIG. 1 a platform P is shown, wherein the platform P is comprised in a group comprising motor vehicles such as military vehicles, utility vehicles, automobiles, boat, helicopter or similar, a power station, any electrically driven machine or similar device wherein the device comprises an electric machine for operation thereof. The platform P comprises at least one electric machine I comprising an arrangement for reducing eddy current losses of the electric machine I according to the present invention.

According to an embodiment in which the electric machine is comprised in a motor vehicle the electric machine is configured for propulsion of said motor vehicle, which thereby comprises an electrically driven motor vehicle. The arrangement for reducing eddy current losses of the electric machine may be configured according to any of the below described embodiments.

Figure 2:
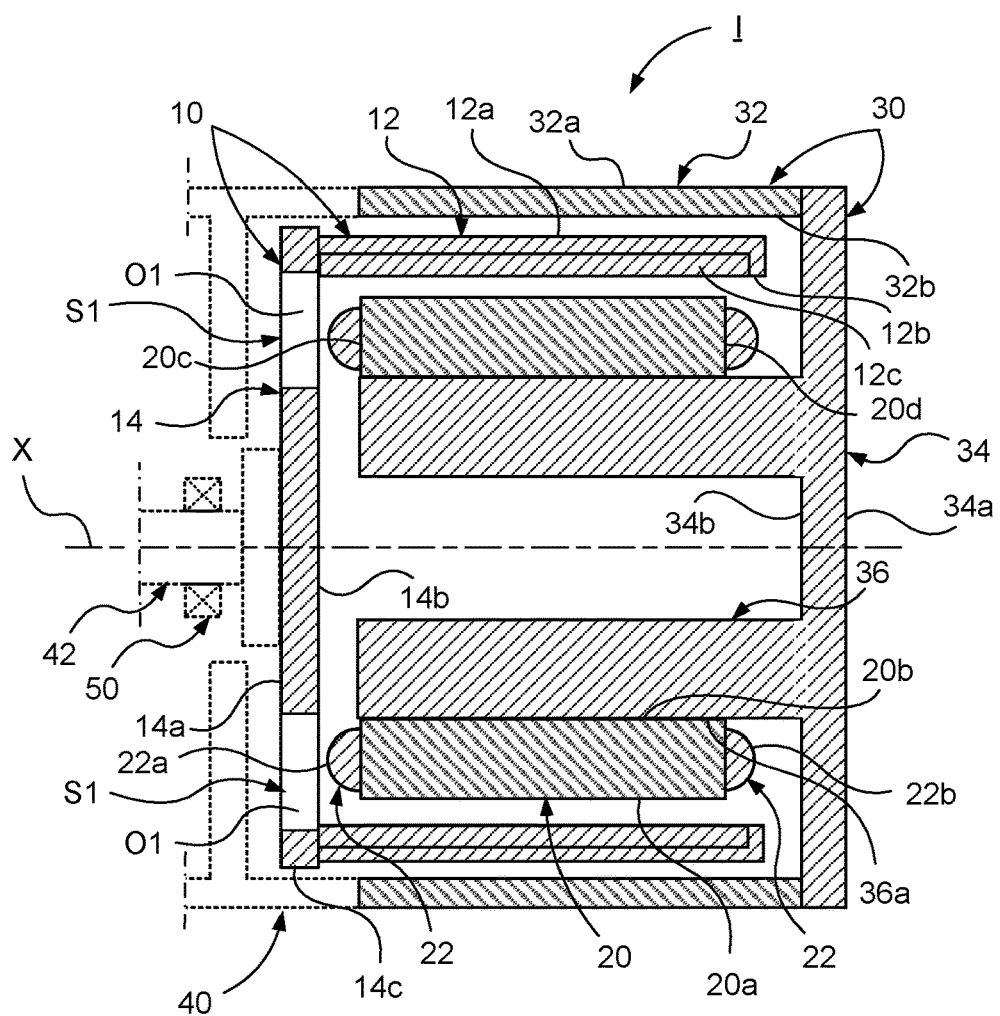
FIG. 2 schematically illustrates a cross section view of an outer rotor electric machine comprising an arrangement for reducing eddy current losses of the electric machine according to an embodiment of the present invention.

FIG. 2 schematically illustrates a cross section view of an outer rotor electric machine I comprising an arrangement O1, S1 for reducing eddy current losses of the electric machine according to an embodiment of the present invention.

The electric machine I is thus of outer rotor type. The outer rotor electric machine I may be any type of outer rotor electric machine with a rotatably arranged rotor and a stator. The electric machine I in FIG. 2 comprises a rotatably arranged rotor 10 and a stator 20 provided with windings 22.

By electric machine I of outer rotor type, i.e. outer rotor electric machine I, is meant an electric machine I wherein the rotor 10 or portion of the rotor is arranged to enclose the stator 20 or part of the stator 20.

The rotor 10 comprises an outer rotor portion 12 arranged to surround the stator 20 or part of the stator 20. The outer rotor portion 12 has an essentially tubular configuration. The outer rotor portion 12 has an exterior surface 12a and interior surface 12b opposite to the exterior surface 12a. The outer rotor portion 12 may comprise magnets 12c.

The rotor 10 further comprises a wheel like end wall portion 14. The wheel like end wall portion 14 may, according to an embodiment, be constituted by a flywheel portion. The end wall portion 14 has an exterior surface 14a and interior surface 14b opposite to the exterior surface 12a. The wheel like end wall portion 14 has a circumferential outer surface 14c.

The stator 20 has an essentially tubular configuration. The stator comprises stator windings 22. The stator 20 has an exterior surface 20a and interior surface 20b opposite to the exterior surface 20a. The stator 20 has a first end 22a arranged to face said end wall portion 14 of the rotor 10 and an opposite second end 22b. The first end 22a of the stator 20 is thus arranged to face the interior surface 14b of the end wall portion 14 of the rotor 10.

Figure 3:
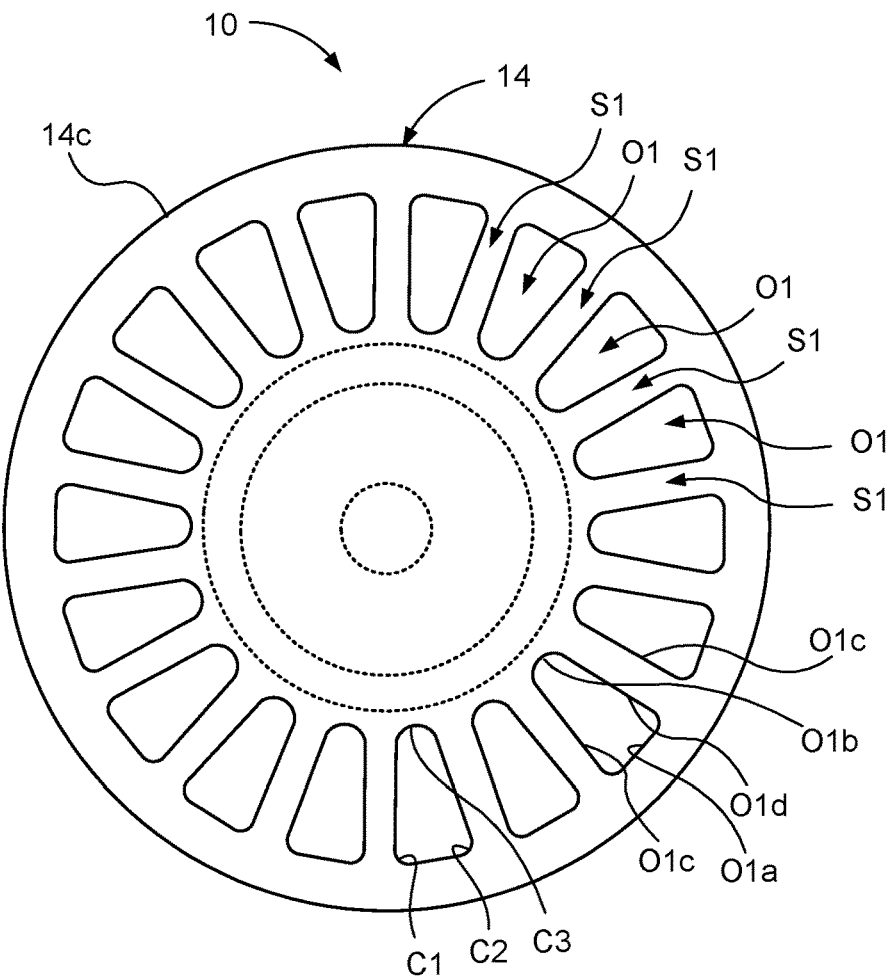
FIG. 3 schematically illustrates a plan view of a rotor for an outer rotor electric machine according to FIG. 2, said rotor comprising an arrangement for reducing eddy current losses according to an embodiment of the present invention.
Figures 4, 5:
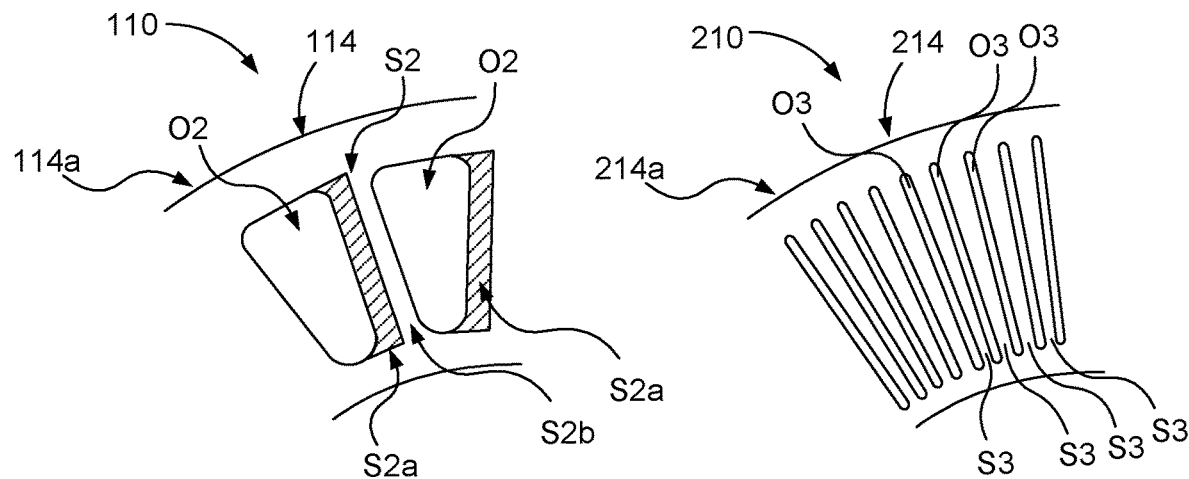
FIG. 4 schematically illustrates a portion of a rotor for an outer rotor electric machine according to FIG. 2, said rotor comprising an arrangement for reducing eddy current losses according to an embodiment of the present invention.
FIG. 5 schematically illustrates a portion of a rotor for an outer rotor electric machine according to FIG. 2, said rotor comprising an arrangement for reducing eddy current losses according to an embodiment of the present invention.

The rotor 10 comprises an arrangement O1, S1 for reducing eddy current losses. Said arrangement O1, S1 comprises a plurality of openings O1 distributed on said end wall portion 14 so as to reduce appearance of eddy currents associated with said end wall portion 14 during operation of said electric machine. FIG. 3, FIG. 4 and FIG. 5 illustrates plan views of different embodiments of such distributed openings. By thus distributing a plurality of openings O1 on the end wall portion 14 so that eddy currents are reduced a very compact electric machine I with high efficiency is obtained in that the stator 20 may be arranged close to the wheel like rotor wall portion 14 as shown in FIG. 2.

Said openings O1 are according to an aspect of the present disclosure through holes running through said end wall portion 14. Said openings O1 are running through said end wall portion 14 from the side of the exterior surface 14a to and through the side of the interior surface 14b of the end wall portion 14.

Said openings O1 may be distributed circumferentially of said end wall portion 14. The openings O1 are distributed and configured so that they efficiently break circuits for eddy currents on the end wall portion 14.

Said openings may be obtained by a number of radially running spokes S1, see e.g. FIG. 3, distributed around said wheel like end wall portion 14. The radially running spokes are arranged to be distributed around said wheel like end wall portion 14 so that said openings O1 are obtained there between. The arrangement O1, S1 comprises according to an aspect of the present disclosure said spokes S1.

The stator 20 is according to a variant constructed from stacked stator plates (not shown). The stator windings 22 according to a variant comprises a set of electrically conductive wires/conductors, preferably copper wires, through which a current is arranged to be conducted for operating the electric machine I. Said wires may be of different thickness. Said stator windings 22 are arranged to run axially so that the winding is adjacently near the rotor 10. The stator winding 22 is arranged to extend axially from end portions 20c, 20d of the stator, turned outside of the end portions and reintroduced through the end portions 20c, 20d, whereby said extending portion of the stator winding forms a so called coil ends constituting said first and second ends 22a, 22b of the stator 20.

The electrically conductive wires of the stator 20 is according to a variant arranged to run axially in slots or apertures of said stator plates, whereby the different wire segments are arranged to be guided out from the end portions of the stator 20 from a slot or aperture of the stator plates and back into a different slot or aperture of the stator plates.

The interior surface 12b of the outer rotor portion 12 is arranged nearby and separated from the exterior surface 20a of the stator 20. The rotor 10 is arranged concentrically relative to the stator 20.

The electric machine I comprises or is attached to a housing configuration 30. The housing configuration 30 is arranged to house at least part of the rotor 10 and stator 20.

The housing configuration 30 comprises an outer wall portion 32. The outer wall portion 32 has an exterior surface 32a and an interior surface 32b. The outer wall portion 32 has an essentially tubular configuration. The outer wall portion 32 of the housing configuration 30 is arranged to surround at least parts of the rotor 10 and stator 20.

The housing configuration 30 comprises a housing end wall portion 34. The housing end wall portion 34 has an exterior surface 34a and an interior surface 34b. The interior surface 34b of the housing end wall portion 34 is arranged to face the second end 22d of the stator 20 and the rotor 10, i.e. end portions of the outer rotor portion 12 of the rotor 10.

The housing configuration 30 comprises a stator support portion 36 for supporting said stator 20. The stator support portion 36 is according to this embodiment centrally arranged of the housing 30. The stator support portion 36 is centrally arranged relative to the stator 20. The centrally arranged stator support portion 36 has an exterior surface 36a facing the interior surface 20b of the stator 20. The centrally arranged stator support portion 36 has an exterior surface 36a being attached to said stator 20 for supporting said stator 20.

The stator support portion may alternatively be arranged non-centrally of the housing, i.e. with a certain displacement, e.g. for facilitating an oil sump of the housing. The housing 30 may according to an embodiment have an essentially ring shaped configuration, i.e. exterior surface 32a, where the support portion of the housing is centrally arranged as in FIG. 2, or alternatively non-centrally arranged.

Said rotor 10 is intended to be attached to an axle. The rotor 10 may be attached to a drive shaft and is thus arranged to rotate the drive shaft or arranged to be rotated by the drive shaft. The rotor 10 is configured to be rotated about an axis X.

According to an embodiment of the arrangement said end wall portion 14 of the rotor 10 constitutes a flywheel portion 14.

In the embodiment shown in FIG. 2 the electric machine I is operably connected to an internal combustion engine 40. A portion of said internal combustion engine 40 is illustrated with dotted lines in FIG. 2. The internal combustion engine 40 is according to an embodiment a diesel engine.

The internal combustion engine 40 has a crankshaft 42 which is journaled in bearings 50. The crankshaft 42 of the internal combustion engine is attached to the flywheel portion 14 of the rotor 10. The combustion engine 40 may be arranged to drive the electric machine I by means of the crankshaft 42 connected to the flywheel 14 of the rotor of the electric machine I, wherein the electric machine will operate as a generator. In such an embodiment the electric machine I is operating as a flywheel generator.

When thus using e.g. an internal combustion engine 40 for rotation of said rotor 10 by using the flywheel portion 14 of the rotor 10 as the flywheel of the internal combustion engine so that the crankshaft of the internal combustion engine is directly connected to the flywheel portion 14 of the rotor a compact device is obtained, thus not requiring any coupling or internal combustion engine flywheel. Thus the rotor will provide the flywheel function.

The outer rotor electric machine I according to the present invention may also be used as an electric starter motor used to rotate the internal combustion engine 40 by rotating the crankshaft 42 so as to initiate the operation of the engine 40.

Above an outer rotor electric machine I is a flywheel electric machine. The outer rotor electric machine according to the present invention may be any suitable outer rotor electric machine having a rotor comprising any kind of end wall portion plurality of openings distributed on the end wall portion so as to reduce appearance of eddy currents associated with said end wall portion during operation of said electric machine. The end wall portion thus does not need to be configured as a flywheel.

The outer rotor electric machine according to the present invention may be any suitable outer rotor electric machine for any suitable operation. The outer rotor electric machine according to the present invention may be any suitable outer rotor electric machine and may be configured to operate as a generator or an electric motor. FIG. 3 schematically illustrates a plan view of a rotor 10 for an electric machine according to FIG. 2.

The rotor 10 may be the rotor according to FIG. 2. The rotor 10 thus comprises the end wall portion 14. The rotor 10 comprises an arrangement O1, S1 for reducing eddy current losses according to an embodiment of the present invention.

Said arrangement comprises a plurality of openings O1 distributed on said end wall portion 14 so as to reduce appearance of eddy currents associated with said end wall portion 14 during operation of said electric machine. By thus distributing a plurality of openings O1 on the end wall portion 14 so that eddy currents are reduced a very compact electric machine I with high efficiency may be obtained in that the stator 20 may be arranged close to the wheel like rotor wall portion 14 as shown in FIG. 2. Said openings O1 are according to an aspect of the present disclosure through holes running through said end wall portion 14. Said openings O1 are thus according to an aspect of the present disclosure running through said end wall portion 14 as described and illustrated in FIG. 2.

According to this embodiment of the arrangement O1, S1 said openings are distributed circumferentially of said end wall portion 14. The openings O1 are distributed and configured so that they efficiently break circuits for eddy currents on the end wall portion 14.

Said openings are obtained by a number of radially running spokes S1 distributed around said wheel like end wall portion 14. The radially running spokes S1 are distributed around said wheel like end wall portion 14 so that said openings O1 are obtained there between. Radially running spokes provides a robust wheel like rotor wall portion 14 with openings O1 there between for efficient reduction of eddy currents.

According to this embodiment of the arrangement O1, S1 said openings O1 have a circular sector configuration. The openings O1 thus have an essentially triangular configuration. Openings O1 having a circular sector configuration provide a robust wheel like rotor wall portion 14 with openings there between for efficient reduction of eddy currents.

The openings O1 have a base end O1a facing the outer circumference of the wheel like rotor wall portion 14, a pointier opposite end O1b facing the centre of the wall portion 14 and sides O1c, O1d According to an embodiment of the arrangement said circular sector configuration of said plurality of openings O1 have rounded corners C1, C2, C3. By thus providing rounded corners C1, C2, C3 of said circular sector configuration of said plurality of openings O1 the risk of cracks occurring are in connection to the openings O1 is reduced, wherein a robust wheel like rotor wall portion 14 is obtained.

According to an embodiment of the arrangement said end wall portion 14 constitutes a flywheel portion 14.

FIG. 4 schematically illustrates a portion of a rotor 110 for an outer rotor electric machine.

Said rotor 110 comprises an arrangement O2, S2 for reducing eddy current losses according to an embodiment of the present invention. The rotor 110 may be applied to an outer rotor electric machine according to FIG. 2.

The rotor 110 comprises an end wall portion 114. The rotor 110 comprises an arrangement O2, S2 for reducing eddy current losses according to an embodiment of the present invention.

Said arrangement comprises a plurality of openings O2 distributed on said end wall portion 114 so as to reduce appearance of eddy currents associated with said end wall portion 114 during operation of said electric machine. By thus distributing a plurality of openings O2 on the end wall portion 114 so that eddy currents are reduced a very compact outer rotor electric machine with high efficiency may be obtained in that the stator may be arranged close to the wheel like rotor wall portion as shown in FIG. 2. Said openings O2 are according to an aspect of the present disclosure through holes running through said end wall portion 114. Said openings O2 are according to an aspect of the present disclosure running through said end wall portion 114.

According to this embodiment of the arrangement O2, S2 said openings O2 are distributed circumferentially of said end wall portion 114. The openings O2 are distributed and configured so that they efficiently break circuits for eddy currents on the end wall portion 114.

Said openings are obtained by a number of radially running spokes S2 distributed around said wheel like end wall portion 114. The radially running spokes S2 are distributed around said wheel like end wall portion 114 so that said openings O2 are obtained there between. Radially running spokes provides a robust wheel like rotor wall portion 114 with openings O2 there between for efficient reduction of eddy currents. The arrangement O2, S2 comprises according to an aspect of the present disclosure said spokes S2.

According to this embodiment of the arrangement O2, S2 said openings O2 have a circular sector configuration. The openings O2 thus have an essentially triangular configuration. Openings O2 having a circular sector configuration provide a robust wheel like rotor wall portion 114 with openings there between for efficient reduction of eddy currents.

According to this embodiment of the arrangement O2, S2 said radially running spokes S2 distributed around said end wall portion 114 comprise a sloped radially running surface S2a creating a portion with an increased distance to said rotor. Said radially running spokes S2 distributed around said end wall portion 114 comprise a non-sloped radially running surface S2b.

The embodiment of the arrangement O2, S2 according to FIG. 4 differs from the embodiment of the arrangement O1, S1 according to FIG. 3 essentially by said sloped radially running surface S2a of the radially running spokes S2. By thus providing a sloped radially running surface creating a portion with an increased distance to said rotor an even more compact electric machine is facilitated in that the stator may be arranged close to the rotor end wall portion and still obtaining the reduction of appearance of eddy currents at the end wall portion of the rotor.

FIG. 5 schematically illustrates a portion of a rotor for an electric machine according to FIG. 2

Said rotor 210 comprises an arrangement O3, S3 for reducing eddy current losses according to an embodiment of the present invention. The rotor 210 may be applied to an electric machine according to FIG. 2.

The rotor 210 comprises an end wall portion 214. The rotor 210 comprises an arrangement O3, S3 for reducing eddy current losses according to an embodiment of the present invention.

Said arrangement O3, S3 comprises a plurality of openings O3 distributed on said end wall portion 214 so as to reduce appearance of eddy currents associated with said end wall portion 214 during operation of said electric machine. By thus distributing a plurality of openings O3 on the end wall portion 214 so that eddy currents are reduced a very compact outer rotor electric machine with high efficiency may be obtained in that the stator may be arranged close to the wheel like rotor wall portion as shown in FIG. 2. Said openings O3 are according to an aspect of the present disclosure through holes running through said end wall portion 214. Said openings O3 are according to an aspect of the present disclosure running through said end wall portion 214.

According to this embodiment of the arrangement O3, S3 said openings are distributed circumferentially of said end wall portion 214. The openings O3 are distributed and configured so that they efficiently break circuits for eddy currents on the end wall portion 214.

Said openings are obtained by a number of radially running spokes S3 distributed around said wheel like end wall portion 214. The radially running spokes S3 are distributed around said wheel like end wall portion 214 so that said openings O3 are obtained there between. Radially running spokes provides a robust wheel like rotor wall portion 214 with openings O3 there between for efficient reduction of eddy currents. The arrangement O3, S3 comprises according to an aspect of the present disclosure said spokes S3.

According to this embodiment of the arrangement said openings O3 are slots running radially on said flywheel portion.

The embodiment of the arrangement O3, S3 according to FIG. 5 differs from the embodiment of the arrangement O1, S1 according to FIG. 3 essentially by the slot shape of the openings O3 and thus the configuration of the spokes S3 in order to provide said radially running slots O3. According to an embodiment the radially running slots are provided by providing relatively thin radially running spokes distributed around the wheel like end wall portion 214 relatively close to each other. Such radially running slots O3 provides efficient reduction of eddy currents and may be particularly efficient for reducing eddy currents when the electric machine is operated at high frequencies. The efficiency of reduction of eddy currents increases with the number of radially running slots O3. Slots O3 facilitates providing a greater number of openings radially distributed around the wheel like end wall portion 214.

Above, with reference to FIG. 3-5, different embodiments of pluralities of openings O1; O2; O3 distributed on said end wall portion 14; 114; 214 so as to reduce appearance of eddy currents associated with said end wall portion 14; 114; 214 during operation of said electric machine have been described.

The openings distributed on said end wall portion may have any suitable configuration and may be distributed in any suitable way. The openings distributed on said end wall portion may thus alternatively have an irregular shape and/or may be distributed irregularly on said end wall portion.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications suited to the particular use contemplated.

The invention claimed is:

1. An outer rotor electric machine, said electric machine comprising
a rotatably arranged rotor and
a non-rotating stator comprising axially running stator windings having opposite coil ends, said rotor comprising
an outer rotor portion surrounding said stator or part of said stator and
a flywheel portion,
wherein one of said coil ends of said stator is arranged to face said flywheel portion, wherein said electric machine is configured for association with a combustion engine for driving said rotor, said flywheel portion of said rotor constituting a flywheel for said combustion engine when associated with said combustion engine, said internal combustion engine comprising a crankshaft for directly connecting to said flywheel portion of the rotor,
wherein, during operation of said outer rotor electric machine, an electric load and an electric frequency are provided that change a magnetic field, wherein said non-rotating stator windings cause eddy currents in the rotating flywheel portion that cause eddy current losses,
said electric machine comprising an arrangement for reducing such eddy current losses of the outer rotor electric machine, said arrangement comprising a plurality of openings distributed on said flywheel portion so that said coil end facing said flywheel portion faces said openings as to reduce appearance of said eddy currents associated with said end wall portion during operation of said electric machine.

2. The outer rotor electric machine according to claim 1, wherein said openings are distributed circumferentially of said flywheel portion.

3. The outer rotor electric machine according to claim 1, wherein said openings are obtained by a number of radially running spokes distributed around said flywheel portion.

4. The outer rotor electric machine according to claim 1, wherein said openings are slots running radially on said flywheel portion.

5. The outer rotor electric machine according to claim 1, wherein said openings have a circular sector configuration.

6. The outer rotor electric machine according to claim 5, wherein said circular sector configuration of said plurality of openings have rounded corners.

7. The outer rotor electric machine according to claim 1, wherein said radially running spokes distributed around said flywheel portion comprise a sloped radially running surface creating a portion with an increased distance to said rotor.

8. The outer rotor electric machine according to claim 1, wherein said electric machine is a flywheel electric machine.

9. The outer rotor electric machine according to claim 1, wherein said electric machine comprises a housing configuration comprising a stator support portion for supporting said stator.

10. A platform comprising an outer rotor electric machine according to claim 1.

11. The platform according to claim 10, comprising a vehicle.

* * * * *